(12) United States Patent
Cretin et al.

(10) Patent No.: US 12,087,923 B2
(45) Date of Patent: Sep. 10, 2024

(54) BATTERY PACK AND BATTERY MANAGEMENT SYSTEM

(71) Applicant: IEE INTERNATIONAL ELECTRONICS & ENGINEERING S.A., Echternach (LU)

(72) Inventors: Arthur Cretin, Luxembourg (LU); Patrick Di Mario Cola, Serrouville (FR); Thierry Goniva, Luxembourg (LU); Lukas Würth, Arlon (BE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 18/282,724

(22) PCT Filed: Mar. 10, 2022

(86) PCT No.: PCT/EP2022/056112
§ 371 (c)(1),
(2) Date: Sep. 18, 2023

(87) PCT Pub. No.: WO2022/194651
PCT Pub. Date: Sep. 22, 2022

(65) Prior Publication Data
US 2024/0234843 A1    Jul. 11, 2024

(30) Foreign Application Priority Data
Mar. 18, 2021  (LU) .................................. LU102686

(51) Int. Cl.
*H01M 10/48* (2006.01)
*H01M 10/42* (2006.01)
(Continued)

(52) U.S. Cl.
CPC ......... *H01M 10/48* (2013.01); *H01M 10/425* (2013.01); *H01M 50/211* (2021.01);
(Continued)

(58) Field of Classification Search
None
See application file for complete search history.

(56) References Cited

U.S. PATENT DOCUMENTS

| 8,741,458 B2 * | 6/2014 | Berman ............... H01M 50/209 |
| | | 429/57 |
| 2007/0054157 A1 | 3/2007 | Ryu et al. |

(Continued)

FOREIGN PATENT DOCUMENTS

DE    102012209271 A1    12/2013

OTHER PUBLICATIONS

International Written Opinion corresponding to application PCT/EP2022/056112; dated Jun. 10, 2023; 6 pages.

(Continued)

*Primary Examiner* — Scott J. Chmielecki
(74) *Attorney, Agent, or Firm* — Reising Ethington P.C.

(57) ABSTRACT

Battery pack having at least one battery cell arranged within a housing, and a sensor arrangement arranged between the battery cell and an abutting surface. The sensor arrangement has first and second carrier foils separated by a spacer having a recess. A contact arrangement having first and second electrodes are arranged on the respective first and second carrier foils at the recess. In the operating state, the first electrode is spaced apart a first distance from the second electrode and, in a deformation state, a deformation of the battery cell is detected by a variation of an electrical property of the contact arrangement. The second carrier foil has an inlay having a second recess accommodating an activator unit arranged on the second carrier foil such that, (Continued)

after a transition from the operating state in the deformation state, a pressure force is transmitted via the activator unit.

11 Claims, 1 Drawing Sheet

(51) Int. Cl.
*H01M 50/211* (2021.01)
*H01M 50/578* (2021.01)

(52) U.S. Cl.
CPC .. *H01M 50/578* (2021.01); *H01M 2010/4271* (2013.01); *H01M 2200/20* (2013.01)

(56) References Cited

U.S. PATENT DOCUMENTS

| | | |
|---|---|---|
| 2009/0038930 A1 | 2/2009 | Chabach |
| 2013/0323554 A1 | 12/2013 | Heubner et al. |
| 2014/0107949 A1 | 4/2014 | Arnold et al. |
| 2017/0324122 A1 | 11/2017 | Poirier et al. |
| 2018/0040926 A1* | 2/2018 | Keser ................ H01M 10/0436 |

OTHER PUBLICATIONS

International Search Report corresponding to application PCT/EP2022/056112; dated Jun. 10, 2023; 3 pages.

* cited by examiner

BATTERY PACK AND BATTERY MANAGEMENT SYSTEM

TECHNICAL FIELD

The invention relates to a battery pack, a battery management system and a method of operating a battery pack.

BACKGROUND

Modern batteries are used in a wide range of technological fields. For example, batteries are currently used in electrical devices, in vehicles or large-scale industrial facilities. Regularly several batteries, respectively battery cells, such as e.g. pouch cells, are arranged within a housing of a battery pack.

In view of present mobility related technologies, such battery packs represent key elements for storing and providing energy for electrical vehicles (EV), hybrid electric vehicles (HEV), Plug-in hybrid vehicles (PHEV) and new energy vehicles (NEV).

During its service life, a battery pack is not only exposed to demanding environmental impacts, such as e.g. heat, cold and humidity, but also to demanding reaction dynamics such as, for example, the frequency and number of charging and de-charging processes. These aspects influence the total and remaining service life and condition of the battery pack. As a result, battery cells and battery packs are subject to aging and degradation processes, which may increase the occurrence of "swelling" or "gassing".

"Gassing" may generally refer to a phenomenon caused by gas generation inside a battery (cell). Gassing may result from the decomposition of the electrolyte inside the battery and/or be caused by overheating and/or overcharging a battery. A gassing battery cell may swell, break or even explode. "Swelling" generally refers to a volume change of the battery (cell). The swelling may for example be caused by storage and removal processes of lithium ions in and/or on the electrode. Swelling may also be caused by gassing. Swelling leads to a mechanical deformation of the battery cell, which causes pressure forces in and/or on the enclosure of the battery cell and/or the battery pack. In order to compensate swelling, battery manufacturers usually use rigid structures such as metal or hard plastic housings which counter expansions of the housing.

An expansion, respectively a displacement or dilatation caused by the occurrence of pressure forces during swelling, may correlate with the so called "State of Health" (SOH) of a battery pack. "State of health" generally refers to the aging state of a battery pack, which thus represents a measure, respectively an indicator, of the battery pack's ability to store and deliver electrical energy in comparison to a new battery pack. The dilatation is also used to determine and/or predict the end of life (EOL) of the battery pack. The EOL generally is used to determine a period in which the battery pack may be safely charged and discharged. The EOL may also be used, like the SOH, as an indicator for indicating the remaining operating time, respectively the remaining service life time, of the battery pack.

In order to enhance the security and reliability of the battery pack in its operation environment, a battery management system (BMS) is often used to determine or estimate the state of charge (SOC) of the respective battery cells of the battery pack as well as the SOH and the EOL. The "state of charge" generally refers to the available capacity which might be expressed or represented as a percentage of its predetermined capacity. In other words, SOC, EOL and SOH are indicators that are determinable by the BMS.

It is further possible to configure the BMS to measure and/or determine further parameters of the battery pack and/or the battery cells, such as e.g. the temperature values and/or the voltages of battery cells. The BMS may have also access to predetermined and stored, specific battery cell characteristic data and measurements taken from a reference battery cell and/or a reference battery pack. Based on such data, the BMS may, for example, compare stored and/or measured values of a cell with said reference values in order to more precisely determine the different indicators. The BMS may further be configured to monitor the functioning of the respective cells as well as the charging and discharging processes. As a result, the BMS may identify defective cells and switch off said cells.

The useful life, respectively the service life time or remaining operating time, of the battery may be limited by a maximum pressure applied on the mechanical enclosure, respectively the housing, of the battery pack. Usually, the value of the bearable maximum pressure is known by manufactures. A pressure (force) exceeding the predetermined maximum pressure may lead to a failure of the battery cell, the housing or the entire battery pack. For example, a pressure caused by a swelling of a battery cell, wherein the pressure force exceeds the predetermined maximum pressure value may risk a breach of the battery cell. For this reason, battery management systems may also be configured to detect swellings.

In order to detect a swelling, common battery management systems use algorithms or complex mechanical devices to perform estimations on the current condition, respectively state, of the battery cell and/or the battery pack. The use of said algorithms may be based or rely on more or less correct estimation(s) of the EOL indicator, the SOC indicator or the SOH indicator. Alternatively, the BMS may, in order to determine a state of the battery, be subjected to test conditions within an e.g. laboratory or on a test rig. In this context, the battery pack is examined by means of or connected to complex mechanical measurement devices.

For example, US 2014/0107949 A1 describes a battery management system for use with a battery under test conditions. The system includes a container configured to hold the battery. The system also includes a stress/strain sensor. The container is configured to hold the battery in fixed relationship with respect to the stress/strain sensor. A processor is coupled to the stress/strain sensor, wherein the processor is configured to measure the stress/strain on the battery and determine the state of health (SOH) of the battery based on the measured stress/strain and previously stored SOH relationship data for the battery. The processor may be configured to determine a state of charge (SOC) of the battery based on the measured stress/strain, the SOH of the battery and previously stored SOC relationship data for the battery.

Further for example, DE 10 2012 209 271 A1 describes at least one battery cell with a cell housing and an electrode winding arranged inside the cell housing. The battery management system includes a battery condition detection. The electrode winding of the battery cell is at least partially covered by a pressure-sensitive film sensor and the battery state detection is designed to read in a measured value provided by the pressure-sensitive film sensor or a variable derived from this measured value and as an evaluation parameter for determination to use the battery condition. The battery state detection is designed to determine a threshold force from the swelling of the electrode coil on the basis of the state of charge of the same, using the measured value provided by the pressure-sensitive film sensor or a variable derived from this measured value, which is used for further determination of the state of charge or degree of aging, respectively degree of health.

The different prior art approaches are either prone to inaccurate estimations, or they require particularly high technical efforts. In cases inaccurate estimations occur, the remaining life service time of a battery pack may be miscalculated. For example, if a BMS uses an algorithm based on indicators, such as EOL, in order to determine a potential swelling, an inaccurate determination of said indicator may lead to an erroneous estimation of the swelling condition and may thus lead to an incorrect determination of the remaining operating time of the battery pack. In other words, the BMS may erroneously predict a remaining life service time that is shorter than it actually is. Further for example, establishing complex test conditions to determine a battery pack's condition is usually not possible during the battery pack is operated in its regular working environment.

SUMMARY

It is therefore an object of the invention to provide a battery pack and a battery management system, wherein the battery pack is configured to reliably detect and determine a swelling of a battery cell during the battery pack is used under its regular working conditions.

This object can be achieved by the battery pack and a battery management system according to the independent claim(s).

In one aspect of the present invention, the object is achieved by a battery pack comprising at least one battery cell, in particular a pouch cell, arranged within a housing, and a sensor arrangement arranged between the battery cell and an abutting surface adjacent to the battery cell. The sensor arrangement has a first carrier foil and a second carrier foil, wherein, in an operating state, the first carrier foil and the second carrier foil are spaced apart from one another by a spacer positioned in between the first carrier foil and the second carrier foil. The spacer has a first recess defining an active area of the sensor arrangement, wherein a contact arrangement is arranged within the active area, said contact arrangement comprising at least a first electrode arranged on the first carrier foil and a second electrode arranged on the second carrier foil oppositely of the first electrode. In the operating state, the first electrode is spaced apart a first distance from the second electrode. In a deformation state, a deformation of the battery cell is detected by a variation of an electrical property of the contact arrangement. The sensor arrangement comprises further an elastic inlay arranged on the second carrier foil, wherein the inlay comprises a second recess accommodating an activator unit for transmitting a pressure force acting from the battery cell or the abutting surface to the active area. The activator unit is arranged on the second carrier foil and spaced apart a second distance from the battery cell or the abutting surface, such that, after a transition from the operating state in the deformation state, said pressure force is transmitted via the activator unit.

It is one insight of the present invention that the use of an inlay formed of a compressible material and placed between a first battery cell and a second battery cell housing, or alternatively between a first battery cell and the housing, allows to compensate for an initial swelling of a battery cell during a transition from the regular operating state in an intermediate state, wherein merely an initial swelling occurs.

When an initial swelling occurs, the elastic inlay formed of a compressible material may be compressed to a predetermined thickness. The inlay may for example be formed of at least one of the following: a silicone, a foam, a PUR, a PE based material, or mixtures thereof. In other words, the invention foresees the possibility of compensating a certain dilatation of a battery cell caused by swelling, wherein said dilatation is not immediately detected by the sensor arrangement. As a result, a reaction from the battery pack or the BMS connected to the battery pack is not caused by the initial swelling. The compressible material thus compensates the swelling to a certain, predetermined degree. This is particularly advantageous when the battery pack is used under warm climatic conditions which regularly lead to a slight thermal expansion of the battery cells. In cases where the swelling of the battery cell continuous further, respectively wherein the elastic inlay has already been compressed to its predetermined thickness during a prior initial swelling, a pressure force will be transmitted via the activator unit to the active area of the sensing arrangement.

It is a further insight of the present invention that the dimensioning of the activator unit, the recess wherein the activator unit is arranged, as well as the characteristics of the compressible material allows increasing or decreasing the sensitivity of the sensor arrangement. Due to the arrangement of these components, the sensitivity of the sensor arrangement of the battery pack may be adapted to future working conditions of the battery pack. For example, if a battery pack is likely to be used under rather warm climatic conditions, the elastic inlay may be configured to provide more elasticity whilst the activator unit, respectively activation unit, may be configured to have a particularly low thickness. As a result, the sensor arrangement will be less sensible to an initial swelling of a battery cell that is most likely caused by thermal conditions.

It is a further insight of the present invention that a pressure or pressure force caused by a swelling during a translation from an intermediate state to a deformation state may be detected particularly reliable by a sensor arrangement located in between the battery cells, or alternatively between the housing and a battery cell. The sensor arrangement allows to detect a dilatation and to provide particularly precise information, e.g. in form of electric signals, which allow the BMS to assess the current dilatation as well as the actual state and the indicators of the battery pack or the battery cells. For example, a computing unit comprised by the BMS may estimate, based on the signals received by the sensor arrangement, a current dilatation as well as the pressure caused by a swelling battery cell. These data may be used advantageously for determining the SOH, EOL and/or SOC. In addition, the BMS may also evaluate whether the predetermined maximum pressure force has been reached within a swelling battery cell. Since the BMS predicts more exactly the SOC, SOH and EOL in combination with an exact determination of a pressure measurement, a more exact prediction on remaining service life time of the battery pack and/or the battery cells can be made.

It is a further insight of the present invention that the sensor arrangement of the battery pack may be advantageously configured to detect one or a plurality of pressure levels and to emit corresponding signals, such as for example discrete electric signals. The appliance of a pressure (force) onto the active area of the sensor arrangement causes a variation of an electrical property of the contact arrangement. The contact arrangement is arranged within the active area of the sensor arrangement and may comprise a plurality of electrodes allowing a resistive or capacitive measurement. The corresponding signals emitted by the sensor arrangement will thus enable the BMS to detect a precise state of the swelling. In case where reference values have been predetermined and stored in a memory of the BMS, it is further possible for the BMS to determine a corresponding pressure value and/or a dilatation of a battery cell or the battery pack.

It is a further insight of the present invention that the battery pack can be configured particularly compactly, i.e. in a particularly thin design. This compact, respectively thin design also reduces the overall weight and the space required for the battery pack. Furthermore, the manufacturing cost of the proposed battery pack is particularly economical due to said compact design. In addition, the compact configuration allows also an easy retrofitting or replacement of existing battery packs with the proposed battery pack. The proposed battery pack may also be combined with and/or integrated in various BMS systems from different manufacturers.

"Sensor arrangement", respectively sensor or sensor element, may generally refer to any device, system or structure configured for detecting, determining, measuring and/or monitoring changes or conditions of an environment. The sensor arrangement may be configured to generate, create, determine and/or transmit a (sensor) signal. A (sensor) "signal" refers to a signal, information and/or a transmitted measured value of the sensor arrangement. For example, the senor arrangement may transmit an electric signal, e.g. corresponding to a measured resistance value or a measured capacitive value, representing a process or state parameter to, e.g., a control unit of a battery management system. A "value" may refer to a numerical quantity that is assigned or is determined by calculation and/or measurement. Further for example, the senor arrangement may comprise a plurality of electrodes that are configured for transmitting an electric signal, such as a measured resistance value or a measured capacitive value, representing a process or state parameter to a control unit, such as for example a control unit comprised by the BMS. "Control unit" may refer to a system which comprises at least one of the following: an electronic system, a programmable control unit, a computer, a processor, a storage medium, a user interface, a program, a software application or a similar element "Battery pack" generally refers to an arrangement comprising a housing and at least a battery cell, respectively a battery. Battery cells may have different forms or sizes. For example, a battery cell may comprise or consist of a pouch cell. A battery back may comprise one or a plurality of battery cells.

"Housing" generally refers to a chassis, module or shell. The housing may be configured to accommodate at least one battery cell or a plurality of battery cells. The housing may also provide space for the sensor arrangement.

"Abutting surface" generally refers to a surface or wall or wall segment of an element. For example, an abutting surface may be a surface of the housing or a battery cell. The abutting surface may be a surface that abuts, respectively contacts, the sensor arrangement or elements thereof. In other words, an abutting surface may refer to any kind of surface that adjoins, borders, flanks, fringes, joins, neighbors or is arranged adjacently to the sensor arrangement or elements thereof. Further for example, the sensor arrangement may be arranged between two adjacent, respectively parallel, battery cells consisting of a first battery cell and a second battery cell. The term "adjacent" generally refers to at least two elements which are directly or indirectly arranged next to each other. In other words, the elements may or may not contact each other. For example, a second battery cell may be adjacent to a first battery cell, wherein the second battery cell and the first battery cell are spaced apart a distance from one another. This space provided in between the adjacent, respectively neighboring battery cells may accommodate the sensor arrangement. In other words, the sensor arrangement may be located between two adjacent, respectively neighboring, battery cells which are spaced apart from one another. In such a case, the second battery cell may present an abutting surface which contacts the sensor arrangement. Alternatively, the housing may comprise an abutting surface. For example, the sensor arrangement may be arranged between a battery cell and the housing of the battery pack. In this case, the housing and/or the battery cell may present a surface that abuts, respectively contacts, the sensor arrangement or elements thereof. Alternatively, additional layers may be provided between the abutting surface and the sensor arrangement. It is understood, that the sensor may be oriented in various ways in between two battery cells or in between a battery cell and the housing.

"Foil", respectively carrier foil, may generally refer to a layer or particularly thin piece of material (such as e.g. a plastic). For example, the sensor arrangement may comprise a first carrier foil and a second carrier foil. The carrier foil may be a rigid carrier foil or a flexible carrier foil. It should be noted that at least one of the two carrier foils is flexible. Preferably, the carrier foil is substantially made from a plastic material that is selected from, but not limited to, a group of plastic materials formed by polyethylene terephthalate (PET), polyimide (PI), polyetherimide (PEI), polyethylene naphthalate (PEN), polyoxymethylene (POM), polyamide (PA), polyphthalamide (PPA), and polyether ether ketone (PEEK). The carrier foil may be deformable when said carrier foil is subjected to a pressure force.

"Spacer", respectively spacer layer or spacing layer, may refer to a layer or device which allows to providing or establishing a gap and/or space and/or distance between at least two elements, such as for example the first carrier foil and the second carrier foil, when the battery pack is in its operating state. The spacer may be formed of an elastic material. For example, the spacer may consist of or comprise a double-sided adhesive film, wherein said double-sided adhesive film may, during a production step, be jointly laminated with the first carrier foil and the second carrier foil.

"Operating state" refers to a state or condition wherein a swelling or an expansion or a dilatation of the volume of a battery cell or the battery pack has not occurred. An "intermediate state" refers to a state wherein an initial swelling has occurred and lead to an at least partial compression of the elastic inlay, yet the dilatation of the swelling has not caused a pressure force transmission of onto the active area of the sensor arrangement. A "deformation state" refers to a state wherein a swelling of the battery cell has occurred such that a pressure force is applied onto the active area of the sensor arrangement. For example, in the deformation state, the compressible elastic inlay is compressed to its maximum and a further swelling of the battery causes a transmission of a pressure force, e.g. a transmission of at least parts of the pressure force from the abutting surface via an activator unit to the active area of the sensor arrangement.

"Active area" refers to a section, volume, space or portion of the sensor arrangement wherein the electrodes are positioned. The active area may be configured to allow a relative movement of the electrodes towards or away from each other. The active area may for example comprise or consist of a "recess", respectively a gap or a space or a void, wherein the plurality of electrodes is accommodated within said recess. The plurality of electrodes may form part of a contact arrangement. For example, the electrodes may be coated in or comprise a pressure-sensitive material such that a contact resistance measured by the sensing arrangement varies in dependency to the pressure force applied on the active area.

"Contact arrangement" generally refers to an arrangement presenting a plurality of electrodes or similar conductive elements used for carrying out measurements. The contact arrangement may for example have two electrodes spaced oppositely to each other. Alternatively, the contact arrangement may be formed of a plurality of electrodes, such as for example three electrodes, wherein one electrode of said three electrodes faces, respectively may be arranged oppositely to, the other two electrodes.

"Variation of an electrical property of the contact arrangement" generally refers to a change, in particular a change with regards to the amount or level of an electric signal. For example, during the deformation state, a pressure force is applied on the contact arrangement and an electric signal may be emitted from the contact arrangement that varies in comparison to an electric signal that is generated during the operating state when no pressure force is applied on the contact arrangement. "Electrical property" may refer to any one of the following electrical properties of the contact arrangement: a resistance, a capacitance, a current and/or a voltage.

"Inlay" generally refers to a layer having elastic properties. The inlay may comprise or consist of an elastic material. An elastic material is a material able to change its form when force is applied to said material.

"Activator unit" generally refers to a device or element that is configured for transmitting a pressure force. In particular, the activator unit may be configured to transmit a force from the abutting surface, e.g. the abutting surface of the housing or the abutting surface of a battery cell, to the active area of the contact arrangement.

In an embodiment, the activator unit comprises or consists of at least one of the following: a plastic, a polyethylene, a polyester, polyethylene naphthalate (PEN), polyimide, or mixtures thereof.

In a further embodiment, the first electrode and the second electrode are printed, etched or milled. Providing electrodes that are etched, milled or, preferably, printed, allows providing reliable electrodes that are formed particularly quickly and cost-effectively.

In a further embodiment, the abutting surface forms part of a further battery cell or the housing. The housing may present an abutting surface, so that the sensor arrangement may be arranged, respectively installed, between said abutting surface of the housing and an adjacent battery cell. Alternatively, a further, respectively second, battery cell may provide an abutting surface, such that the sensor arrangement may be arranged, respectively mounted, between said abutting surface of the second battery cell and the adjacent (first) battery cell. In other words, the sensor arrangement may be installed between two battery cells or a battery cell and the housing.

In a further embodiment, the second carrier foil has a first surface, wherein the second electrode is arranged on said first surface and extending from said first surface in a direction towards the first electrode, and wherein the second carrier foil has a second surface, wherein the activator unit is arranged on said second surface and extending from said second surface in a direction towards the abutting surface of the housing or the further battery cell. In a further embodiment the first distance is larger than the second distance in an operating state. In an arrangement in which, in an operating state, the first distance between the electrodes is greater than the second distance between the activator unit and the abutting surface, a first contact between the activator unit and the abutting surface occurs in cases of a swelling, whilst a second contact between the two electrodes is prevented. In cases where the battery is subject to further swelling, the second distance may be reduced until a contact between the electrodes is established.

In a further embodiment the first recess and the second recess are at least partially flush with one another. "Flush" refers to an arrangement wherein the first recess and the second recess are at least partially aligned, respectively within one line. In such an arrangement, a particularly uniform and rapid force transmission may be achieved on the active area when force is applied on the activator unit. This enhances a particularly fast response of the contact arrangement.

In a further embodiment, the elastic inlay comprises at least one of the following: a foam, a polyurethane (PUR), a silicon, a polyethylene (PE), a plastic, or mixtures thereof. An elastic inlay consisting or comprising a compressible material may be used or configured to further enhance the sensitivity of the sensor arrangement of the battery pack.

In a further embodiment, the contact arrangement is operatively connected to a battery management system. The battery management system may be any commonly used battery management system. By connecting the contacting arrangement of the battery pack to the battery management system, the BMS may receive and operate the measurement signals of the contacting arrangement.

In a further embodiment, the elastic inlay has, in an operating state, a thickness that is larger than the thickness of the spacer. "Thickness" generally refers to a size dimension, such as e.g. a size of a material or element, in particular a size between opposite surfaces of a layer. For example, in an arrangement wherein the elastic inlay has a thickness that is larger than the thickness of the spacer, the elastic inlay may provide the possibility for an enhanced compression in relation to a compression provided by the spacer. As a result, the sensitivity of the sensor arrangement may be adapted to the predetermined maximum pressure. The spacer may have, for example, a thickness smaller than 1 mm and the inlay may have a thickness in a range of 1 mm to 10 mm, preferably in a range of 1 mm to 3 mm. "Pressure", respectively load force, pressure force or compressive force, generally refers to an effect exerted on a surface by a force or a plurality of forces. It is understood that the pressure force or the plurality of pressure forces may act in different directions.

The invention also concerns a battery management system comprising a battery pack. The aforementioned improvements and embodiments of the battery pack also apply to the battery management system.

The invention also concerns a method for operating a battery pack. The aforementioned improvements and embodiments of the battery pack also apply to the method.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
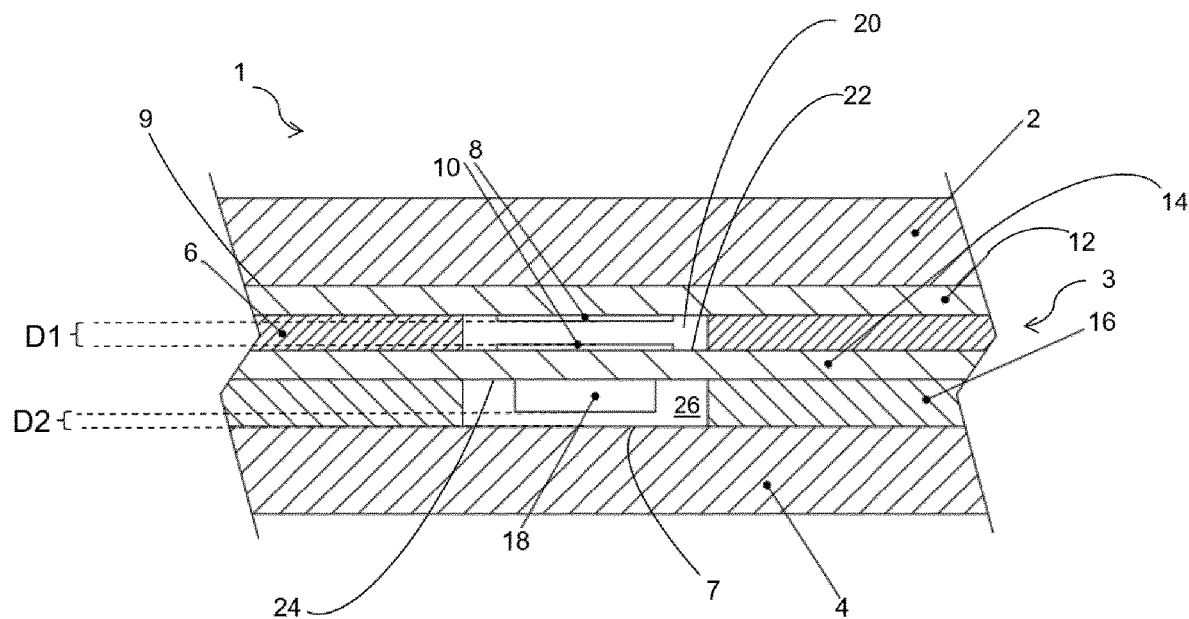
FIG. 1 schematically illustrates a sectional view of an embodiment of a battery pack in an operating state, wherein the battery pack comprises a sensor arrangement.

FIG. 1 schematically illustrates a sectional view of an embodiment of a battery pack 1 comprising a sensor arrangement 3 arranged in between two adjacent battery cells 2, 4. The battery cells 2, 4 are formed as pouch cells (not shown). The battery pack 1 is arranged within a housing formed of a rigid material (not shown).

As can further be derived from FIG. 1, battery cell 2 comprises an abutting surface 9 which contacts the sensor arrangement 3. In other words, the abutting surface is arranged directly adjacent to the sensor arrangement 3. The abutting surface 9 forms part, respectively represents a wall, of the battery cell 2. In alternative embodiments (not shown), the abutting surface 9 may be part of the housing. In addition, the second cell 4 comprises likewise an abutting surface 7, wherein said abutting surface 7 is at least partially in contact with the sensor arrangement 3, in particular partially in contact with the elastic inlay 16 of the sensor arrangement 3.

The illustrated sensor arrangement 3 comprises four layers. These layers are arranged in the following sequence (when seen from the first battery cell 2): a first carrier foil 12, a spacer 6, a second carrier foil 14 and an elastic inlay 16. It is understood, that the sensor may comprise further layers in different embodiments. The sensor arrangement presents a bendable and flexible configuration.

The first carrier foil 12 and the second carrier foil 14 are formed of a plastic having merely a thickness in a range of 0,100 mm to 0,175 mm, for example a thickness of about 0,125 mm. The inlay has a thickness in a range of 1 mm to 3 mm, for example a thickness of about 2 mm. Due to this particularly thin arrangement, the carrier foil provides a certain degree of flexibility and elasticity whilst providing stability. The carrier foils 12, 14 are substantially made from a plastic material that is selected from, but not limited to, a group of plastic materials comprising at least one of the following: polyethylene terephthalate (PET), polyimide (PI), polyetherimide (PEI), polyethylene naphthalate (PEN), polyoxymethylene (POM), polyamide (PA), polyphthalamide (PPA), polyether ether ketone (PEEK) or mixtures thereof. The inlay material comprises at least one of the following: a silicone, a foam, a polyurethane (PUR), a polyethylene (PE) based material, or mixtures thereof.

In an operating state, the first carrier foil 12 and the second carrier foil 14 are spaced apart a distance from one another by means of the spacer 6 positioned in between the first carrier foil 14 and the second carrier foil 12. The spacer 6 consists of a double-sided adhesive film laminated with the first carrier foil 12 and the second carrier foil 14.

As can be further derived from FIG. 1, the spacer 6 has a first recess 20, respectively a hollow space, defining the active area. The thickness of the spacer 6 defines the thickness of the first recess 20 as well as the distance between the first carrier foil 14 and the second carrier foil 12. The active area is the area wherein the contact arrangement is situated. In addition, the active area allows a certain movement of the electrodes 8, 10 towards or away from each other.

The elastic inlay 16 is arranged on the second carrier foil 14 and comprises a second recess 26. The first recess 20 and the second recess 26 are flush with one another. The elastic inlay 16 is formed of a material allowing a certain compression caused by the abutting surface 7 of the battery cell 4. The recess 26 accommodates, respectively provides a space for, the activator unit 18. As can be derived from FIG. 1, the second electrode 10 is arranged on a first surface 22 of the second carrier foil 14. The activator unit 18 is placed on the other side of the carrier foil 14, respectively on the second surface 24 of the carrier foil 14. The second electrode 10 extends from the first surface 22 in a direction towards the first electrode 8. The activator unit 18 extends from the second surface 24 in a direction towards the abutting surface 7.

The illustrated contact arrangement consists of two oppositely placed electrodes 8, 10, wherein each one of the first and second electrodes 8, 10 is arranged on a respective carrier foil 12, 14. In the operating state, the first electrode 8 is spaced apart a known first distance D1 from the second electrode 10. During or after the battery cell entered the deformation state caused by a swelling, for example a swelling of battery cell 4 or battery cell 2, the distance between the first electrode 8 and the second electrode 10 decreases or vanishes completely. In the deformation state, the electrodes 8, 10 are moved more closely to one another, or are even brought in contact with one another. The measurements of the sensor arrangement 3 may be performed permanently or at predefined time intervals. As long as the battery cell operates in the operating state or in the intermediate state, the measurement signals determined by the contact arrangement will be substantially constant. In comparison to that, during or after the transition from the operating state or the intermediate state to the deformation state, a deformation is detected by a variation of an electrical property, e.g. a capacity or a resistance, of the contact arrangement. The contact arrangement illustrated in FIG. 1 comprises two electrodes 8, 10 configured to allow a capacitive measurement. Due to this arrangement, a measurement generating precise and discrete measurements may be carried out.

The measurement may generate a signal having a specific value that corresponds to the actual distance D1 between the two electrodes 8, 10. The signal and/or the value may be transmitted by the sensor arrangement to an external element, such as e.g. a battery management system (not shown). Based on the received signal and/or signal value, the battery management system determines, e.g. by means of a set of pre-stored data taken from a reference measurement and/or a reference battery cell, the actual distance between the two electrodes and/or a state of the battery cell. Additionally, or alternatively, the battery management system may, based on said signal or signal value determine different indicators such EOL, SOH and/or SOC.

In the operating state, the activator unit 18 is spaced apart a second distance D2 from the abutting surface 9. After the elastic inlay 16 has been compressed to a predefined thickness caused by a swelling of a battery cell, e.g. the second battery cell 4, the second distance D2 vanishes and the activator unit 18 contacts the abutting surface 7 such that the activator unit 18 transmits a pressure force caused by a further dilatation of the adjacent battery cell 4. At this point, a transition from the intermediate state to the deformation state occurs. The pressure force from the abutting surface 7 is then transmitted via the activator unit 18 onto the active zone comprising the two electrodes 8, 10. Similarly, a swelling of the first battery cell 2 may likewise lead to a compression of the elastic inlay 16 and, in cases the deformation state occurs, a subsequent transmission of pressure forces from the abutting surface 7 via the activator 18 to the active zone and/or a transmission of pressure forces from the abutting surface 9 of the swelling battery 2 onto the active area of the sensor arrangement 3.

It is understood that according to other embodiments (not shown), the contact arrangement may alternatively comprise or consist of other functional elements, such as for example a load sensor or a plurality of electrodes, e.g. three electrodes, or similar elements.

As can be further derived from FIG. 1, the dimensioning of the activator unit may be varied in dependence to the e.g. the thickness of the elastic inlay 16, the first distance D1 or the second distance D2.

Figure 2:
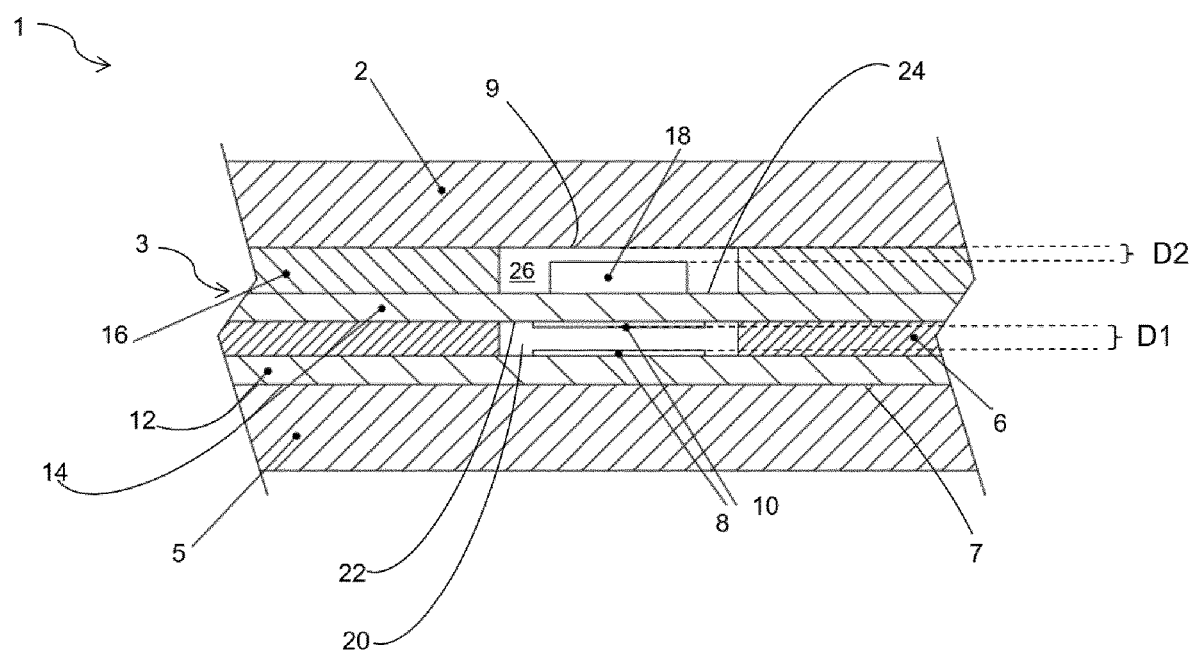
FIG. 2 schematically illustrates a sectional view of an embodiment of a battery pack in an operating state, wherein the sensor arrangement is arranged between a battery cell and an abutting surface.

FIG. 2 schematically illustrates a sectional view of another embodiment of a battery pack 1 in an operating state. In comparison to the embodiment illustrated in FIG. 1, FIG. 2 illustrates a battery pack 1 having a sensor arrangement 3 installed between the housing 5 of the battery pack 1 and the battery cell 2, wherein the activator unit 18 of the sensor arrangement 3 faces the abutting surface 9 of said battery cell 2. Further neighboring battery cells (not shown) may be arranged parallel to the (first) battery cell 2. The first carrier foil 12 contacts directly the abutting surface 7 of the housing 5, whilst the elastic inlay 16 abuts the battery cell 2. While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. Battery pack comprising at least one battery cell, in particular a pouch cell, arranged within a housing, and a sensor arrangement arranged between the battery cell and an abutting surface adjacent to the battery cell;
   wherein the sensor arrangement has a first carrier foil and a second carrier foil; wherein, in an operating state, the first carrier foil and the second carrier foil are spaced apart from one another by a spacer positioned in between the first carrier foil and the second carrier foil;
   wherein the spacer has a first recess defining an active area of the sensor arrangement, wherein a contact arrangement is arranged within the active area, said contact arrangement comprising at least a first electrode arranged on the first carrier foil and a second electrode arranged on the second carrier foil oppositely of the first electrode; wherein, in the operating state, the first electrode is spaced apart a first distance from the second electrode, and wherein, in a deformation state, a deformation of the battery cell is detected by a variation of an electrical property of the contact arrangement; and
   wherein the sensor arrangement further comprises an elastic inlay arranged on the second carrier foil, wherein the inlay comprises a second recess accommodating an activator unit for transmitting a pressure force acting from the battery cell or the abutting surface to the active area; and wherein the activator unit is arranged on the second carrier foil and spaced apart a second distance from the battery cell or the abutting surface, such that, after a transition from the operating state in the deformation state, said pressure force is transmitted via the activator unit.

2. Battery pack according to claim 1, wherein the activator unit comprises at least one of the following: a plastic, a polyethylene, a polyester, polyethylene naphthalate, polyimide, or mixtures thereof.

3. Battery pack according to claim 1, wherein the first electrode and the second electrode are printed, etched or milled.

4. Battery pack according to claim 1, wherein the abutting surface forms part of a further battery cell or the housing.

5. Battery pack according to claim 4, wherein the second carrier foil has a first surface, wherein the second electrode is arranged on said first surface and extending from said first surface in a direction towards the first electrode, and wherein the second carrier foil has a second surface, wherein the activator unit is arranged on said second surface and extending from said second surface in a direction towards the abutting surface of the housing or the further battery cell.

6. Battery pack according to claim 1, wherein, in an operating state, the first distance is larger than the second distance.

7. Battery pack according to claim 1, wherein the first recess and the second recess are at least partially flush with one another.

8. Battery pack according to claim 1, wherein the elastic inlay comprises at least one of the following: a foam, a polyurethane, a silicone, a polyethylene, a plastic, or mixtures thereof.

9. Battery pack according to claim 1, wherein the contact arrangement is configured to be operatively connectable to a battery management system.

10. Battery pack according to claim 1, wherein the elastic inlay has, in an operating state, a thickness that is larger than the thickness of the spacer.

11. Battery management system comprising the battery pack according to claim 1.

* * * * *